Oct. 22, 1963 A. G. BURNS 3,108,234
MODULATED OSCILLATOR
Filed Jan. 26, 1961
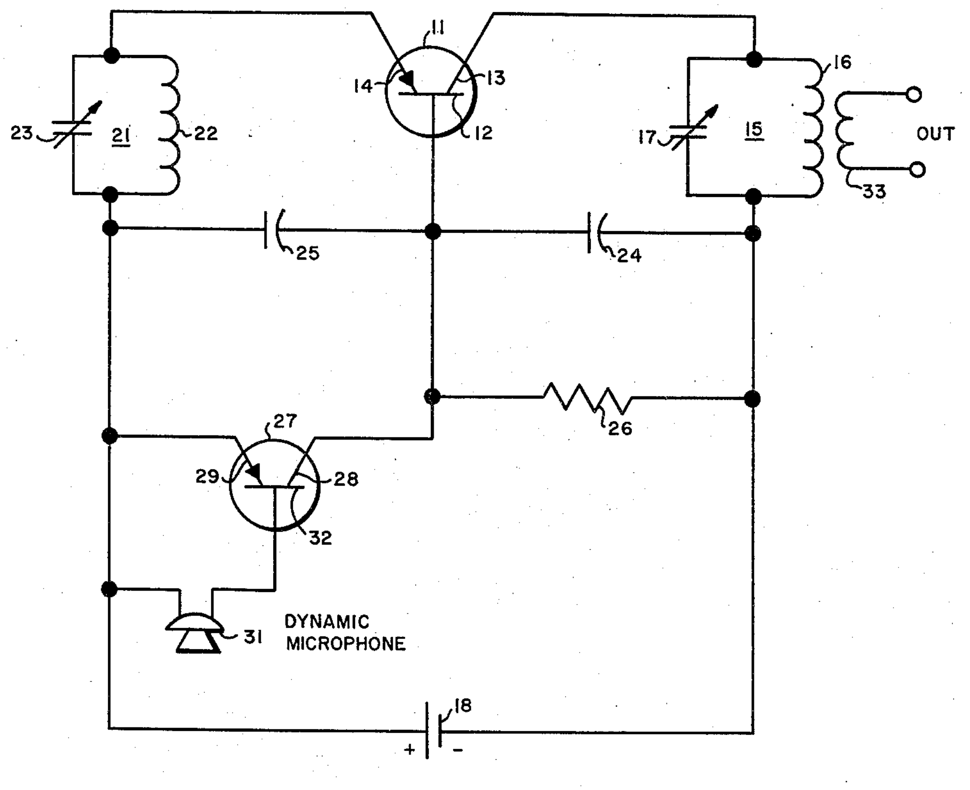
INVENTOR.
ARTHUR G. BURNS
BY H. L. Mackay
ATTORNEY United States Patent Office 3,108,234
Patented Oct. 22, 1963

3,108,234
MODULATED OSCILLATOR

Arthur G. Burns, Yorktown Heights, N.Y., assignor to General Precision, Inc., a corporation of Delaware Filed Jan. 26, 1961, Ser. No. 85,062
6 Claims. (Cl. 332—59)

This invention relates generally to circuits for generating modulated radio frequency energy and particularly to transistor circuits having low power supply requirements for generating radio frequency energy modulated in accordance with acoustic signals.

Transistor oscillators, modulators and amplifiers are, of course, well known. When it has been desired to generate radio frequency energy modulated in accordance with acoustic signals it has been customary to provide (1) an oscillator using one or more transistors, (2) a microphone and its amplifier using one or more transistors, and (3) a modulator using one or more transistors. In such an arrangement, each transistor consumes power and, additionally, each transistor requires biasing circuitry, usually in the form of resistive voltage dividers, which also consume power.

It is a general object of the present invention to provide apparatus having low power supply requirements for generating modulated radio frequency energy.

Another object is to provide apparatus requiring but two transistors for generating radio frequency energy modulated by acoustic signals.

Another object is to provide apparatus for generating radio frequency energy modulated by acoustic signals which apparatus requires but little, if any, more power than a single transistor oscillator alone.

Briefly stated, a specific embodiment of the invention comprises a grounded base transistor oscillator having a parallel resonant tank circuit in series with the collector and capacitatively coupled to the base. A power supply such as a small battery biases the collector and emitter with opposite polarities and a voltage divider across the power supply biases the base to an intermediate potential. One leg of this voltage divider comprises the collector-emitter circuit of a second transistor and a dynamic microphone connected between the emitter and base of the second transistor. Acoustic signals reaching the microphone cause a corresponding modulation of the radio frequency energy in the tank circuit.

For a clearer understanding of the invention reference may be made to the following detailed description and the accompanying drawing, the single FIGURE of which is a schematic diagram of the invention.

Referring now to the drawing, there is shown a PNP transistor 11 including a base 12, a collector 13 and an emitter 14. The collector 13 is connected to one terminal of a parallel resonant circuit 15 comprising an inductance 16 and a variable capacitor 17, the other terminal of which is connected to the negative terminal of a source of unidirectional voltage such as a battery 18. The emitter 14 is connected to one terminal of another parallel resonant circuit 21 comprising an inductance 22 and a capacitor 23, the other terminal of which is connected to the positive terminal of the battery 18. The latter resonant circuit, the circuit 21, may be physically constructed with an inductance and a separate capacitor, as shown, or may comprise a so-called "self-resonant" choke in which the capacitance is provided by the inherent capacitance between the turns of the choke winding.

The terminal of the resonant circuit 15 which is remote from the collector 13 is coupled to the base 12 by means of a capacitor 24 of a suitable value to present a low impedance to radio frequencies of interest and a high impedance to audio frequencies. A similar capacitor 25 couples the terminal of the resonant circuit 21 which is remote from the emitter 14 to the base 12. The base 12 is biased to a potential intermediate that of the collector 13 and the emitter 14 by means of a voltage divider connected across the battery 18. One portion of the voltage divider comprises a resistor 26 connected between the negative terminal of the battery 18 and the base 12 while the other portion of the voltage divider comprises the collector-emitter circuit of a transistor 27, the collector 28 being connected to the base 12 and the emitter 29 being connected to the positive terminal of the battery 18. A dynamic microphone 31 interconnects the base 32 and the emitter 29. The microphone 31, as the word "dynamic" suggests, is one which generates an electromotive force in response to incident acoustic signals and which provides a direct current path between its terminals. Useful output may be obtained from a winding 33 coupled to the inductance 16.

For purposes of explaining the operation, let it be assumed at first that the transistor 27 and the microphone 31 have been removed from the circuit and replaced by a resistor joining the positive battery terminal to the base 12 and the resistor 26. The voltage divider action of the two resistors biases the base 12 to a potential intermediate that of the collector 13 and the emitter 14. The resulting circuit is a conventional grounded base oscillator the frequency of which is determined primarily by the constants of the elements comprising resonant circuit 15. However, it is noted that the collector to base capacitance of the transistor 11 is effectively in parallel with the resonant circuit 15, and accordingly that capacitance will affect the frequency of oscillation. Additionally, it is noted that the collector-base capacitance is a function of collector current.

Returning now to the circuit shown in the drawing, the collector-emitter circuit of the transistor 27 constitutes one portion of the voltage divider and the impedance of this circuit therefore affects the base-emitter bias of the transistor 11. In the absence of a signal at the microphone 31, the collector-emitter impedance of the transistor 27 is such as to bias the transistor 11 so that oscillations are generated. When an acoustic signal reaches the microphone 31 a voltage is generated which varies the base-emitter voltage of transistor 27 causing a variation in the collector-emitter current of transistor 27 which variation may be thought of as a variation in collector-emitter impedance. Such a variation in turn causes a variation in the base-emitter bias of the transistor 11, a corresponding variation in the current of collector 13, a variation in the collector-base capacitance of the transistor 11, and a variation in both the amplitude and the frequency of the oscillatory energy generated.

By way of example, the following components have been found to operate satisfactorily.

| | |
|---|---|
| Transistor 11 | Texas Instrument Company germanium transistor, type 2N 1141. |
| Transistor 27 | General Transistor Company germanium transistor, type GT 75. |
| Resonant circuits 15 and 21 | Inductance and capacitance resonant at 200 m.c.p.s. |
| Capacitors 24 and 25 | 0.001 $\mu$f. |
| Resistor 26 | 50,000 ohms. |
| Microphone 31 | Shure model MC–11. |
| Battery 18 | 1.5 volt dry cell. |

A model constructed with the above components has generated substantial amounts of radio frequency energy at a frequency of 200 m.c.p.s. with both amplitude and frequency modulation in accordance with voice signals incident on the microphone 31. With an antenna connected to the winding 33, the voice signals have been recovered by a standard FM receiver several hundred feet away.

It is noted that the modulated oscillator of the present invention uses little if any more power than that required by a conventional oscillator alone. This result is achieved because the transistor 27 uses only that power which otherwise would be dissipated by a biasing resistor between the base 12 and the positive battery terminal.

Although a specific embodiment has been described for illustrative purposes, many modifications can be made within the spirit of the invention. It is, therefore, desired that the protection afforded by Letters Patent be limited only by the true scope of the appended claims.

What is claimed is:

1. In a grounded base transistor oscillator having a resonant circuit coupled between the collector and base and having a voltage divider connected across a source of unidirectional potential for biasing the collector and emitter at opposite polarities with respect to the base, the improvement wherein that portion of the voltage divider connected between the base and emiter circuits consists solely of the collector-emitter circuit of a second transistor and a dynamic microphone connected between the base and emitter of the second transistor.

2. Apparatus for generating modulated radio frequency energy, comprising, first and second transistors each including a base, a collector and an emitter, said first transistor being connected in a grounded base oscillatory circuit including a resonant circuit coupled between said collector and said base, a source of unidirectional potential for biasing said collector and said emitter of said first transistor to opposite polarities, a voltage divider connected across said source for biasing said base of said first transistor to a potential intermediate that of said collector and emitter, said voltage divider consisting solely of a resistor in series with the collector-emitter circuit of said second transistor, and a dynamic microphone connected to said emitter and said base of said second transistor.

3. Apparatus for generating modulated radio frequency energy, comprising, first and second transistors, each having a base, a collector and an emitter, said first transistor being connected in a grounded base oscillatory circuit including a resonant circuit coupled between said collector and said base, a source of unidirectional potential having first and second terminals, said first terminal being conductively connected to said collector of said first transistor and said second terminal being conductively connected to said emitter of said first transistor, a voltage divider connected across said first and second terminals and having an intermediate point connected to said base of said first transistor, the portion of said voltage divider connected between said base of said first transistor and said second terminal consisting solely of the collector-emitter circuit of said second transistor, and a dynamic microphone connected to said base and said emitter of said second transistor.

4. Apparatus for generating modulated radio frequency energy, comprising, a first transistor having a base, a collector and an emitter, a resonant circuit coupled to said base and said collector, a source of unidirectional voltage having first and second terminals, said first terminal being conductively connected to said collector, said second terminal being conductively connected to said emitter, a voltage divider comprising first and second sections serially connected across said source, said first section being connected between said first terminal and said base, said second section being connected between said base and said second terminal, a second transistor having a base, a collector and an emitter, said second section consisting solely of the collector-emitter circuit of said second transistor, and a dynamic microphone connected between said base and said emitter of said second transistor.

5. Apparatus for generating modulated radio frequency energy, comprising, a first transistor including a base, a collector and an emitter, a first tuned circuit coupled to said collector and to said base, a second tuned circuit coupled to said emitter and to said base, a source of unidirectional voltage having first and second terminals, said first terminal being conductively to said collector, said second terminal being conductively connected to said emitter, a resistor connected from said first terminal to said base, a second transistor including a base, a collector and an emitter, said collector of said second transistor being connected to said base of said first transistor, said emitter of said second transistor being connected to said second terminal, and a dynamic microphone interconnecting said base and said emitter of said second transistor.

6. Apparatus for generating modulated radio frequency energy, comprising, a first transistor including a base, a collector and an emitter, a source of unidirectional voltage having first and second terminals, a first parallel resonant circuit interconnecting said collector and said first terminal, a second parallel resonant circuit interconnecting said emitter and said second terminal, a first capacitor interconnecting said first terminal and said base, a second capacitor interconnecting said second terminal and said base, a resistor connected in parallel with said first capacitor, a second transistor including a base, a collector and an emitter, said collector of said second transistor being connected to said base of said first transistor, said emitter of said second transistor being connected to said second terminal, and a dynamic microphone interconnecting said base and said emitter of said second transistor.

References Cited in the file of this patent

UNITED STATES PATENTS

| | | |
|---|---|---|
| 2,570,938 | Goodrich | Oct. 9, 1951 |
| 2,750,507 | Law et al. | June 12, 1956 |
| 2,768,296 | Herzog | Oct. 23, 1956 |
| 2,855,568 | Lin | Oct. 7, 1958 |
| 3,035,188 | Assco | May 15, 1962 |

FOREIGN PATENTS

| | | |
|---|---|---|
| 815,911 | Great Britain | July 1, 1959 |